United States Patent Office 3,365,354
Patented Jan. 23, 1968

3,365,354
OVERLAY SHEET AND PROCESS FOR
MAKING THE SAME
Peter N. Britton, Scotch Plains, N.J., assignor to Johnson
& Johnson, a corporation of New Jersey
No Drawing. Original application Aug. 7, 1963, Ser. No.
300,648. Divided and this application Jan. 30, 1967, Ser.
No. 612,346
12 Claims. (Cl. 161—150)

ABSTRACT OF THE DISCLOSURE

This invention relates to the treating of a nonwoven web of substantially 100% acrylic fibers with a solution of dimethyl sulfoxide to facilitate autogenic bonding of such web to provide a nonwoven overlay sheet.

---

This is a division of application Ser. No. 300,648 filed Aug. 7, 1963.

Decorative laminates generally comprise a base material, which may be superimposed layers of synthetic resin-impregnated paper or a sheet of chipboard, plywood, etc., on top of which is placed a decorative sheet. The decorative sheet may be a synthetic resin-impregnated decorative paper, i.e., a paper having a wood-like grain, metal flecks or other design, or a wood veneer, or similar materials. On top of the decorative sheet is placed a synthetic resin-impregnated overlay sheet. Heat and pressure are applied to the laminate to compress and fuse the plies (base material, decorative sheet and overlay sheet) into a dense solid sheet which is used for counter tops, wall paneling, etc.

In the final laminate the overlay sheet is transparent to the eye so that in net effect the appearance of the laminate is similar to the appearance of the decorative sheet. The overlay sheet protects the decorative sheet during use and for this purpose it must be tough, abrasion-resistant and resistant to solvents, heat, water, etc.

It is important in such overlay sheets that they be extremely uniform in construction, contain virtually no impurities, be relatively inert to the effects of heat and humidity, etc.

The overlay sheets of the present invention consist entirely or almost entirely of acrylic fibers united at their points of intersection with adjacent fibers to form a unitary sheet. The sheet has a dense construction which is uniform over the entire area of the sheet and throughout the thickness of the sheet. The unitary acrylic fiber sheet has good strength, is tough, abrasion-resistant and resistant to heat, water, etc. The surface of the acrylic fiber sheet is smooth and has substantially no loose ends of fibers sticking out of the plane of the sheet.

In accordance with the present invention the overlay sheet is made by forming a web of 100% acrylic fibers. The fibers in the web are in overlapping and intersecting relationship. The fibrous web is treated with an aqueous solution of dimethyl sulfoxide. The web containing the dimethyl sulfoxide is heated while the web is confined, i.e., under slight pressure on both outer surfaces to activate the dimethyl sulfoxide, remove the water and produce a unitary sheet of autogenically bonded 100% acrylic fibers. Preferably, the autogenically bonded acrylic fiber fabric is treated a second time with a weaker aqueous solution of dimethyl sulfoxide and again heated, while the treated fabric is confined, to dry the fabric and produce a 100% acrylic fiber fabric having smooth outer surfaces.

The use of the acrylic fibers is important because with such fibers, in accordance with the method of the invention there is obtained a fabric which does not contain neps or clumps of fibers and which is substantially uniform in thickness and has a uniform distribution of fibers over its entire area. The decorative laminate made with the overlay sheet of the invention has a uniform, smooth, glossy, transparent surface which is resistant to water, solvents and heat, and is tough and resistant to abrasion.

The acrylic fibers used in accordance with the invention have about the same index of refraction as the resins. Accordingly, in the finished decorative laminates the overlay sheets of the invention are transparent to the eye.

The acrylic fibers which are suitable for use in accordance with the invention are those fibers which are composed of at least 85% by weight of acrylonitrile units. Suitable examples are "Orlon," "Acrilan," "Verel," etc. The acrylic fibers are unpigmented and have a denier of from about 1 to 10. The length of the acrylic fiber may range from about 1 to 2 inches or more.

The web of acrylic fibers may be formed by any of the conventional methods known in the art. Suitable examples of such methods are carding, air-laying, water-laying, etc. In the web the acrylic fibers are in overlapping, intersecting relationship and the fibers may be oriented in one or more directions or randomly oriented.

The overlapping, intersecting fibers are held together by being autogenically bonded to adjacent fibers. By autogenic bonding it is meant that fibers are adhered to adjacent fibers by softening the areas of contact between fibers and allowing the fibers to adhere without the use of any outside adhesive agent. In accordance with the present invention the use of autogenic bonding eliminates any material other than acrylic fibers from being in the final product, hence the final product is completely uniform in both chemical and physical characteristics.

Methods of autogenically bonding synthetic fibers are well-known in the art; for example, if the fibers are thermoplastic in nature they may be softened and adhered by the application of heat and pressure. Other methods of autogenic bonding are to apply weak solutions of solvents or swelling agents to the fibrous material to soften the surface of the fibers and adhere them together. However, when autogenically bonding acrylic fibers the use of heat often melts the fiber and causes it to lose many of its fibrous characteristics. Similar loss of fibrous characteristics will occur when many of the known solvents for acrylic fibers are used as autogenic bonding agents. For example, when dimethyl formamide is used to autogenically bond a web of acrylic fibers it either produces a weak bond or if sufficient dimethyl formamide is used to produce a good bond pinholes are burned in the web making the final fabric non-uniform and unsuitable for use as an overlay sheet.

One of the better known solvents and autogenic bonding agents for acrylic fibers are the carbonates such as ethylene carbonate, propylene carbonate, etc. Though these agents produce a well-bonded acrylic fiber sheet they also render the sheet sensitive to water and humidity and if such a sheet is used in a decorative laminate the resultant product readily water spots when placed in contact with water.

In accordance with the present invention an acrylic fiber sheet may be well-bonded, maintain uniformity and its water resistance and be especially suitable for use as an overlay sheet in decorative laminates if the acrylic fibers are autogenically bonded with aqueous solutions of dimethyl sulfoxide. The aqueous solutions of dimethyl sulfoxide used in accordance with the invention contain from about 2% to 20% by weight of dimethyl sulfoxide and preferably from about 3% to 12% by weight of dimethyl sulfoxide. If a concentration of less than about 2% dimethyl sulfoxide is used the resultant fabric is poorly bonded and does not have the required strength of an overlay sheet. If more than about 20% dimethyl sulfoxide is used pinholes are burned in the web and the uniformity of the web greatly disrupted.

The aqueous solution of dimethyl sulfoxide may be applied to the web of acrylic fibers by any of the conventional techniques known in the art such as spraying, padding, saturating, etc. It is important that the binder be uniformly applied to obtain uniform bonding and prevent high concentrations of dimethyl sulfoxide in some areas and low concentrations of dimethyl sulfoxide in other areas.

The web containing the dimethyl sulfoxide is then dried by heating the web to a temperature of from about 212° F. to 400° F. or higher for a period of time of from about 30 seconds to 5 minutes or more.

It is preferred that when the web is being dried it be confined, i.e., it be under slight pressure on both surfaces of the web. It appears that the confinement of the web while being dried is very important in order to produce a well-bonded fabric of high uniformity. It is believed that the confinement uniformly distributes the dimethyl sulfoxide throughout the web and maintains it in intimate contact with the acrylic fibers during the drying to produce a uniformly bonded web.

Acrylic fibers like many synthetic fibers are resilient and when compressed will flatten out but when the pressure is released will spring back to their original position. The application of the aqueous solution of binder flattens and compresses the acrylic fibers but as the water is removed the acrylic fibers tend to spring out of their compressed state. Placing the web containing the dimethyl sulfoxide in a confined state and drying the web while so confined produces a smooth well-bonded fabric. Furthermore, the confinement of the web densifies the web to produce a strong fabric with a uniform fiber distribution.

Suitable methods of drying the web containing the dimethyl sulfoxide while in the confined state are to place the web between a pair of belts and pass the belts with the fabric therebetween into an atmosphere at an elevated temperature to drive off the water, bond the fibers, and dry the fabric. Another suitable method is to pass a continuous belt about a stack of dry cans, cans heated from the inside by steam or other means so that their surface is heated. A number of dry cans are placed in a row or a series of rows to form a stack, and a belt of cotton duck or similar material passed in serpentine fashion from the surface of one can to the surface of the adjacent can. The fabric is to be dried is placed between the belt and can surface and is passed from can to can along with the belt in such a manner that the fabric is pressed against the heated surface of every other can to drive off water, bond the fibers, and dry the fabric.

It is preferred that after the autogenically bonded acrylic fiber fabric is formed it be treated a second time to remove loose ends of fibers which stick out from the general plane of the fabric. This may be accomplished by treating the fabric with a weak aqueous solution of dimethyl sulfoxide of from about 2% to 5% by weight of dimethyl sulfoxide and preferably from about 2% to about 3% by weight dimethyl sulfoxide. The dimethyl sulfoxide may be applied to the bonded fabric by any of the techniques previously described for applying autogenic binders to fibrous webs.

The treated fabric is again dried at temperatures of from about 212° F. to 400° F. for a period of time of from about 30 seconds to 5 minutes. It is preferred that the fabric be dried the second time also in a confined state as previously described.

If desired, the fabric may be given a third or even more similar treatments.

The invention will be further illustrated in greater detail by the following examples. The percentages indicated are by weight unless specifically stated otherwise.

EXAMPLE 1

An air-laid web is formed on a conventional air-laying machine from 100%, 3-denier, 1¼ inch unpigmented acrylic fibers, sold by the E. I. du Pont Corporation under the trade name "Orlon." The web, weighing about 350 grains per square yard, is passed through a saturating bath containing an aqueous solution of 12% dimethyl sulfoxide. The wet pickup is about 120%.

The saturated web is placed on a cotton duck belt while the web is kept under tension and the belt and web passed about a stack of dry cans at a temperature of about 290° F. The web contacts a portion of the surface of every other can while the belt contacts the surface of the intermediate cans. The drying operation takes approximately 30 seconds.

The web is passed a second time through a saturating path as described above. The second saturation bath contains an aqueous solution of 2% dimethyl sulfoxide and the wet pickup is about 100%. The saturated web is dried as described above to produce the fabric of the invention. The final fabric weighs about 350 grains per square yard.

A piece of the fabric is used as the overlay sheet of a decorative laminate using di-allyl phthalate resin as the overall impregnating resin. The laminate is formed by the application of heat and pressure in accordance with conventional procedures, and the overlay sheet along with the resin with which it was impregnated becomes the outer surface of the laminate. The surface is transparent and the decorative design is readily seen without, however, seeing any individual fibers. The surface resists abrasion and is very tough, and is not affected by water, heat or solvents.

EXAMPLE 2

A card web containing 50%, 3-denier, 1¼ inch unpigmented acrylic fibers and 50%, 2-denier, ¾-inch unpigmented acrylic fibers weighing about 400 grains per square yard is passed through a saturating bath containing an aqueous solution of 5% dimethyl sulfoxide. The wet pickup is about 120%.

The saturated web is placed between two cotton duck belts and the "sandwich" placed in an oven at 240° F. for a period of about 2 minutes.

The web is passed a second time through a saturating bath as described above. The second saturation bath contains an aqueous solution of 3% dimethyl sulfoxide and the wet pickup is about 100%. The saturated web is dried as described above to produce the fabric of the invention. The final fabric weighs about 400 grains per square yard.

The fabric used as the overlay sheet of a decorative laminate gives results similar to those stated in Example 1.

EXAMPLE 3

An air-laid web containing 100%, 3-denier, 1¼ inch unpigmented acrylic fibers, sold by the Chemstrand Corporation under the trade name "Acrilan" and weighing about 350 grains per square yard is passed through a saturating bath containing an aqueous solution of 16% dimethyl sulfoxide. The wet pickup is about 120%.

The saturated web is placed on a cotton duck belt while the web is kept under tension and the belt and web passed about a stack of dry cans at a temperature of about 290° F. The web contacts a portion of the surface of every other can while the belt contacts the surface of the intermediate cans. The drying operation takes approximately 30 seconds and produces a well-bonded fabric consisting entirely of acrylic fibers.

The fabric used as the overlay sheet of a decorative laminate gives results similar to those stated in Example 1.

EXAMPLE 4

A card web containing 50%, 3-denier, 1¼ inch unpigmented acrylic fibers and 50%, 1½ denier, 1-inch bright viscose rayon fibers weighing about 350 grains per square yard is autogenically bonded with dimethyl sulfoxide as described in Example 1.

The resultant fabric is passed a second time through a weak solution of dimethyl sulfoxide and dried to remove loose ends of fibers as described in Example 1.

A piece of the fabric is used as the overlay sheet of a decorative laminate using a di-allyl phthalate resin as the over-all impregnating resin. The laminate is formed by the application of heat and pressure in accordance with conventional procedures, and the overlay sheet along with the resin with which it was impregnated becomes the outer surface of the laminate. Individual fibers are seen in the laminate which is dull and the laminate readily clouds over when it comes in contact with water.

EXAMPLE 5

An air-laid web of 100%, 3-denier, 1¼ inch unpigmented acrylic fibers is passed through a saturating bath containing an aqueous solution of 10% dimethyl formamide. The wet pickup is 120%. The saturated web is dried as described in Example 1. The resultant fabric is very weak and is not resistant to water.

A second fabric is made as described above with the exception that the dimethyl formamide is replaced with propylene carbonate. The resultant fabric has good strength but poor water-resistance and when used as the overlay sheet in a decorative laminate readily clouds and becomes dull when water contacts the surface of the decorative laminate.

The invention is not to be construed as limited by the examples previously given nor to the specific features mentioned therein except as the same may be included in the claims appended hereto. It is understood that changes, modifications and variations may be made in the fabric without departing from the spirit and scope of the claimed invention.

What is claimed is:

1. A method of manufacturing a tough, water-resistant, nonwoven fabric of acrylic fibers which comprises: forming a fibrous web of 100% substantially unpigmented acrylic fibers, said fibers being in overlapping, intersecting relationship, uniformly applying to said web an aqueous solution containing from about 2% to about 20% by weight of dimethyl sulfoxide to soften the surface of the acrylic fibers, and drying the treated web to remove the water and adhere adjacent fibers together at their points of intersection whereby a unitary structure consisting of acrylic fibers is formed.

2. A method of manufacturing a tough, water-resistant, nonwoven fabric of acrylic fibers which comprises: forming a fibrous web of 100% substantially unpigmented acrylic fibers, said fibers being in overlapping, intersecting relationship, impregnating said web with an aqueous solution containing from about 2% to about 20% by weight of dimethyl sulfoxide to soften the surface of the acrylic fibers, heating the treated web in a confined state to remove the water and adhere adjacent fibers together at their points of intersection whereby a unitary structure consisting of acrylic fibers is formed.

3. A method of manufacturing a tough, water-resistant, nonwoven fabric of acrylic fibers which comprises: forming a fibrous web of 100% substantially unpigmented acrylic fibers, said fibers being in overlapping, intersecting relationship, impregnating said web with an aqueous solution containing from about 2% to about 20% by weight of dimethyl sulfoxide to soften the surface of the acrylic fibers, heating the treated web to remove the water and adhere adjacent fibers together at their points of intersection whereby a unitary structure consisting of acrylic fibers is formed, impregnating said unitary structure with an aqueous solution containing from about 2% to about 5% by weight of dimethyl sulfoxide and heating the treated structure to remove loose fiber ends on the surface of the unitary structure.

4. A method of manufacturing a tough, water-resistant, nonwoven fabric of acrylic fibers which comprises: forming a fibrous web of 100% substantially unpigmented acrylic fibers, said fibers being in overlapping, intersecting relationship, impregnating said web with an aqueous solution containing from about 2% to about 20% by weight of dimethyl sulfoxide to soften the surface of the acrylic fibers, heating the treated web in a confined state to remove the water and adhere adjacent fibers together at their points of intersection whereby a unitary structure consisting of acrylic fibers is formed, impregnating said unitary structure with an aqueous solution containing from about 2% to about 5% by weight of dimethyl sulfoxide and heating the treated structure in a confined state to remove loose fiber ends on the surface of the unitary structure.

5. A method of manufacturing a tough, water-resistant, nonwoven fabric of acrylic fibers which comprises: forming a fibrous web of 100% substantially unpigmented acrylic fibers, said fibers being in overlapping, intersecting relationship, uniformly applying to said web an aqueous solution containing from about 2% to about 20% by weight of dimethyl sulfoxide to soften the surface of the acrylic fibers, and drying the treated web in a confined state at a temperature of from about 212° F. to 400° F. for a period of time of from about 30 seconds to 5 minutes to remove the water and adhere adjacent fibers together at their points of intersection whereby a unitary structure consisting of acrylic fibers is formed.

6. A method of manufacturing a tough, water-resistant nonwoven fabric of acrylic fibers which comprises: forming a fibrous web of 100% substantially unpigmented acrylic fibers, said fibers being in overlapping, intersecting relationship, uniformly applying to said web an aqueous solution containing from about 3% to about 12% by weight of dimethyl sulfoxide to soften the surface of the acrylic fibers, drying the treated web in a confined state at a temperature of from about 212° F. to 400° F. for a period of time of from about 30 seconds to 5 minutes to remove the water and adhere adjacent fibers together at their points of intersection whereby a unitary structure consisting of acrylic fibers is formed.

7. A method of manufacturing a tough, water-resistant nonwoven fabric of acrylic fibers which comprises: forming a fibrous web of 100% substantially unpigmented acrylic fibers, said fibers being in overlapping, intersecting relationship, uniformly applying to said web an aqueous solution containing from about 2% to about 20% by weight of dimethyl sulfoxide to soften the surface of the acrylic fibers, drying the treated web at a temperature of from about 212° F. to 400° F. for a period of time of from about 30 seconds to 5 minutes to remove the water and adhere adjacent fibers together at their points of intersection whereby a unitary structure consisting of acrylic fibers is formed, uniformly applying to said unitary structure an aqueous solution containing from about 2% to about 5% by weight of dimethyl sulfoxide and drying the treated structure at a temperature of from about 212° F. to 400° F. for a period of time of from about 30 seconds to 5 minutes to remove loose fiber ends on the surface of the unitary structure.

8. A method of manufacturing a tough, water-resistant nonwoven fabric of acrylic fibers which comprises: forming a fibrous web of 100% substantially unpigmented acrylic fibers, said fibers being in overlapping, intersecting relationship, uniformly applying to said web an aqueous solution containing from about 3% to about 12% by weight of dimethyl sulfoxide to soften the surface of the acrylic fibers, drying the treated web at a temperature of from about 212° F. to 400° F. for a period of time of from about 30 seconds to 5 minutes to remove the water and adhere adjacent fibers together at their points of intersection whereby a unitary structure consisting of acrylic fibers is formed, uniformly applying to said unitary structure an aqueous solution containing from about 2% to about 3% by weight of dimethyl sulfoxide and drying the treated structure at a temperature of from about 212° F. to 400° F. for a period of time of from about 30 seconds to 5 minutes to remove loose fiber ends on the surface of the unitary structure.

9. A method of manufacturing a tough, water-resistant nonwoven fabric of acrylic fibers which comprises: forming a fibrous web of 100% substantially unpigmented acrylic fibers, said fibers being in overlapping, intersecting relationship, uniformly applying to said web an aqueous solution containing from about 2% to about 20% by weight of dimethyl sulfoxide to soften the surface of the acrylic fibers, drying the treated web in a confined state at a temperature of from about 212° F. to 400° F. for a period of time of from about 30 seconds to 5 minutes to remove the water and adhere adjacent fibers together at their points of intersection whereby a unitary structure consisting of acrylic fibers is formed, uniformly applying to said unitary structure an aqueous solution containing from about 2% to about 5% by weight of dimethyl sulfoxide and drying the treated structure in a confined state at a temperature of from about 212° F. to 400° F. for a period of time of from about 30 seconds to 5 minutes to remove loose fiber ends on the surface of the unitary structure.

10. A method of manufacturing a tough, water-resistant nonwoven fabric of acrylic fibers which comprises: forming a fibrous web of 100% substantially unpigmented acrylic fibers, said fibers being in overlapping, intersecting relationship, uniformly applying to said web an aqueous solution containing from about 3% to about 12% by weight of dimethyl sulfoxide to soften the surface of the acrylic fibers, drying the treated web in a confined state at a temperature of from about 212° F. to 400° F. for a period of time of from about 30 seconds to 5 minutes to remove the water and adhere adjacent fibers together at their points of intersection whereby a unitary structure consisting of acrylic fibers is formed, uniformly applying to said unitary structure an aqueous solution containing from about 2% to about 3% by weight of dimethyl sulfoxide and drying the treated structure in a confined state at a temperature of from about 212° F. to 400° F. for a period of time of from about 30 seconds to 5 minutes to remove loose fiber ends on the surface of the unitary structure.

11. A method of manufacturing a tough, water-resistant, nonwoven fabric of acrylic fibers which comprises: forming a fibrous web of 100% substantially unpigmented acrylic fibers, said fibers being in overlapping, intersecting relationship, impregnating said web with an aqueous solution containing about 12% by weight of dimethyl sulfoxide to soften the surface of the acrylic fibers, drying the treated web in a confined state at a temperature of from about 240° F. to 300° F. for a period of time of from about 30 seconds to 2 minutes to remove the water and adhere adjacent fibers together at their points of intersection whereby a unitary structure consisting of acrylic fibers is formed, impregnating said unitary structure with an aqueous solution containing about 2% by weight of dimethyl sulfoxide and drying the treated structure in a confined state at a temperature of from about 240° F. to 300° F. for a period of time of from about 30 seconds to 2 minutes to remove loose fiber ends on the surface of the unitary structure.

12. The nonwoven fabric made by the process of claim 11.

References Cited

UNITED STATES PATENTS

| | | | |
|---|---|---|---|
| 2,784,135 | 3/1957 | Wooding et al. | 161—251 X |
| 2,920,992 | 1/1960 | Hubbard | 162—157 |
| 2,986,798 | 6/1961 | Koenig et al. | 28—76 |
| 3,010,858 | 11/1961 | Sexsmith | 161—170 X |
| 3,053,609 | 9/1962 | Miller | 8—128 |
| 3,126,297 | 3/1964 | Diamantopoulos | 117—140 |
| 3,143,437 | 8/1964 | Rosset | 117—138.8 |
| 3,236,586 | 2/1966 | Humphreys | 8—130.1 |
| 3,236,587 | 2/1966 | Genereux | 8—130.1 |
| 3,253,880 | 5/1966 | Lawson | 8—115.5 |
| 3,291,561 | 12/1966 | Abashian | 156—308 X |

EARL M. BERGERT, *Primary Examiner.*

HAROLD ANSHER, *Examiner.*